Sept. 29, 1925,

Re. 16,179

M. WEINER ET AL

ADJUSTABLE TROUSERS

Original Filed July 18, 1924 2 Sheets-Sheet 1

Inventor

MORRIS WEINER
GEORGE S. WEINER,

By Jerry A. Mathews

Attorney

Sept. 29, 1925. Re. 16,179

M. WEINER ET AL

ADJUSTABLE TROUSERS

Original Filed July 18, 1924 2 Sheets-Sheet 2

Inventor

MORRIS WEINER
GEORGE S. WEINER,
By Jerry A. Mathews

Attorney

Reissued Sept. 29, 1925. Re. 16,179

UNITED STATES PATENT OFFICE.

MORRIS WEINER AND GEORGE S. WEINER, OF BICKNELL, INDIANA, ASSIGNORS OF TWO-THIRDS TO SAID GEORGE S. WEINER AND ONE-THIRD TO PERCY W. GLADDEN, OF WORTHINGTON, INDIANA.

ADJUSTABLE TROUSERS.

Original No. 1,516,801, dated November 25, 1924, Serial No. 726,854, filed July 18, 1924. Application for reissue filed February 3, 1925. Serial No. 6,668.

*To all whom it may concern:*

Be it known that we, MORRIS WEINER and GEORGE S. WEINER, citizens of the United States, residing at Bicknell, in the county of Knox and State of Indiana, did invent certain new and useful Improvements in Adjustable Trousers; and it is hereby declared that the following is a full, clear, and exact description of the invention, such as will enable others skilled in the art to which it appertains to use the same.

Our invention relates to improvements in trousers.

In accordance with our invention we so constructed the trousers at the waist that such waist may be adjusted within limits, for making the same larger or smaller. The adjusting means is arranged wholly upon the inner side of the trousers, and hence is not visible in use. The trousers are so constructed that when the waist or waist band is adjusted, the material of trousers at the hips, is adjusted, in a corresponding manner. The construction is such that the adjustment will take up or let out the material at the waist band, equally, in a forward direction and in a rearward direction, thereby maintaining the side pockets in the proper position. The trousers made in accordance with our invention are neat in appearance and the adjustable feature is hardly observable. The fold produced by the adjustment feature, is adapted to be creased and ironed in any selected adjusted position. The straps for the belt are carried near the fold, preventing sagging.

Figure 1:
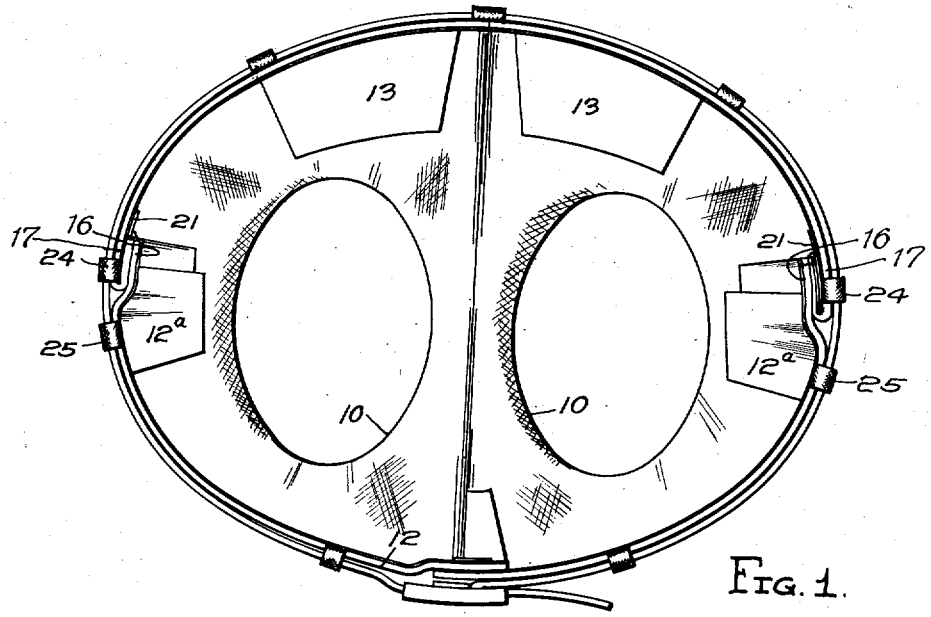
Figure 2:
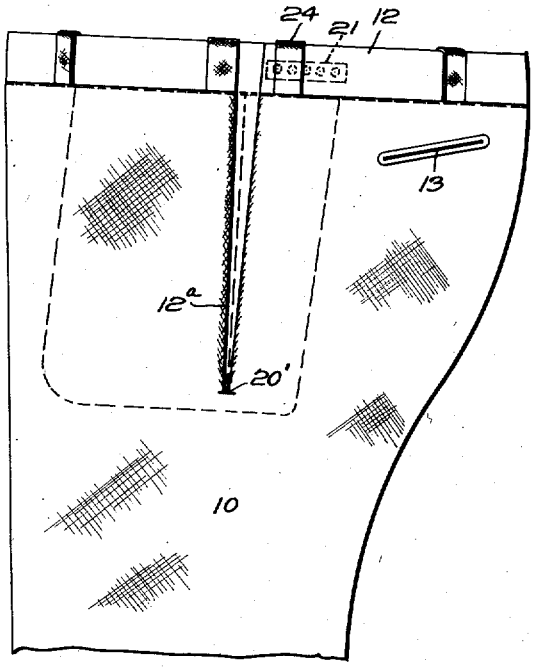
Figure 3:
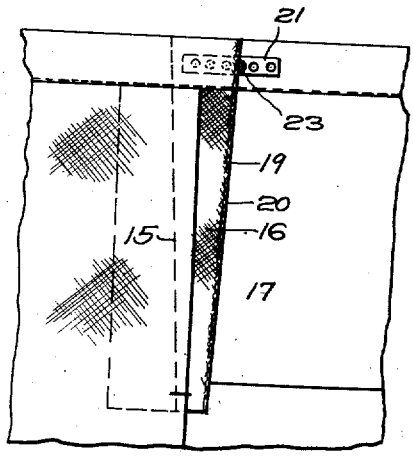
Figure 5:
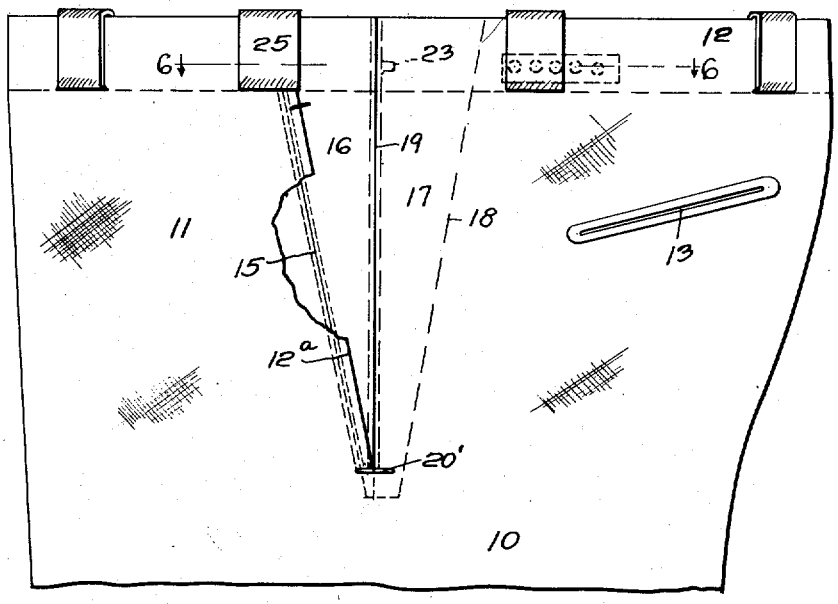
Figure 4:
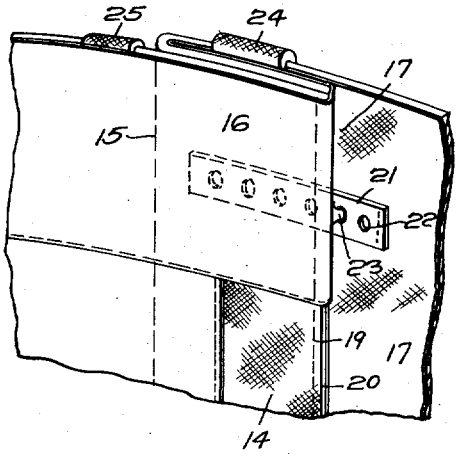
Figure 6:
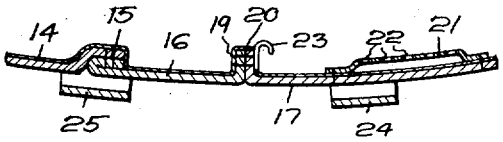

In the accompanying drawings forming a part of this specification and in which like numerals are employed to designate like parts throughout the same, Figure 1 is a plan view of the pair of trousers, embodying our invention, Figure 2 is a side elevation of the same, Figure 3 is an elevation of the inner side, showing the adjustment feature, Figure 4 is the perspective view of a portion of the trousers, showing the adjustment feature, Figure 5 is the side elevation of trousers, showing the parts arranged in a different adjustment, and, Figure 6 is a horizontal section taken on line 6—6 of Figure 5.

The trousers embody the usual legs 10, having upper hip portions 11, provided with a waist band 12. The trousers are equipped with the usual side pockets 12[a] and back pockets 13.

The invention resides principally in the adjustment of the waist band 12, and hip portions 11, for increasing or decreasing the same, within limits. At each side pocket 12[a] is the usual gore 14, to which is stitched at 15, a supplemental gore 16, tapering downwardly. The rear portion of the hip adjacent to the side pocket, is cut full providing a gore 17, tapering downwardly and of substantially the same size as the gore 16. The gore 17 may be regarded as extending from the line 18 to a line of stitching 19. The gores 16 and 17 have their faces contacting and extend inwardly, as indicated at 20, and the stitching 19 passes through these edges. As a result of this, the gores 16 and 17 fold readily upon the stitching 19 and will lie flat against each other. In the ordinary trousers, the material would be cut at the line 18, and the fullness represented by the gore 17, is added to correspond with the fullness produced by the gore 16. The line of stitching 19 extends down to the bottom of the pocket 12, and is secured by the tack 20′. It is thus seen that the gores 16 and 17 are of a substantial length and project slightly below the tack 20′, and by virtue of their length, the fullness of the hip portions of the trousers are properly taken care of, corresponding to the adjustment at the waist line.

Arranged upon the inner side of the waist band 12, is a strip 21, secured thereto by stitching or like, and this strip is equipped with eyelets 22, equi-distantly spaced, for any selected distance such as one-quarter inch, one-half inch or like. Particular attention is called to the fact that the first eyelet 22 is arranged adjacent to the line 18 of the gore 17, and the strip 21 extends horizontally from the line 18. A hook 23 is attached to the gores 16 and 17, at their top, and at the line of stitching 19. These hooks are adapted to engage within selected eyelets 22. While we have found the eyelets and hook a preferred connecting means, as the same lies flat in use, yet the invention is in no sense restricted to this particular type of connecting means, as other devices may be employed.

We arrange a belt loop 24, upon the waist band 12, at the outer edge or line 18 of the gore 17, and we also employ the belt loop 25 attached to the waist line at the outer edge of the gore 16, as shown.

In the use of the trousers, the same will have the smallest possible waist line, when the hook 23 engages within the rearmost eyelet 22. The gores 16 and 17 will be folded flat upon each other, at the line of stitching 19, and the material will also be folded upon the line 18, and may be ironed or creased on this line. This provides a double fold arranged adjacent to the rear edge of pocket. The belt passes through the loops 24 and 25 secured upon this fold and the pocket, preventing either from sagging. To increase the waist line, the hook 23 is inserted in the selected eyelet, to the front. For instance if the eyelets are one-quarter inch apart, and the hook is advanced two eyelets, at each pocket, the waist line would be increased one inch. At each pocket, the waist line will be let out one-quarter inch in a forwardly direction and one-quarter inch in a rearwardly direction, thus retaining the side pocket in a proper relative position. The fold will now be ironed, and creased upon its new line of fold.

We also contemplate applying the invention to ladies' and gentlemen's golf trousers, at the waist and at the bottom; to ladies' and gentlemen's knickers at the waist and bottom; boys' knickers, at the waist and at the bottom, to the waist band of ladies' skirts, and to riding trousers of all kinds at the waist and at the bottom. We also contemplate arranging the hooks and eyelets upon the outer side of the garment as well as on the inner side.

It is to be understood that the form of our invention herewith shown and described is to be taken as a preferred example of the same, and that various changes in the shape, size and arrangement of parts, may be resorted to, without departing from the spirit of our invention, or the scope of the subjoined claims.

Having thus described our invention, we claim:

1. A pair of trousers comprising front and rear hip portions carrying leg portions, a side pocket upon each side of the trousers, a downwardly tapering foldable portion disposed between the front and rear hip portions and extending from the waist band to a point near the lower end of the edge of the pocket, said downwardly tapering foldable portion folding upon lines extending longitudinally thereof whereby such folding adjusts the waist band and hips of the trousers, the outer side of the foldable portion lapping forwardly with respect to the pocket whereby the lap produced extends forwardly with relation to such pocket and will not interfere with the insertion of the hand into the pocket, and means arranged near the waist band to lock the upper overlapped portions of said foldable portions together in a selected adjusted position.

2. A pair of trousers comprising front and rear hip portions carrying leg portions, a side pocket upon each side of the trousers, a downwardly tapering foldable portion disposed between the front and rear hip portions and extending from the waist band to a point beneath the top end of the edge of the pocket, said downwardly tapering foldable portion folding upon lines extending longitudinally thereof whereby such folding adjusts the waist band and hips of the trousers, the outer side of the foldable portion lapping forwardly with respect to the pocket whereby the lap produced extends forwardly with relation to such pocket and will not interfere with the insertion of the hand into the pocket, and means arranged near the waist band to lock the upper overlapped portion of said foldable portions together in selected adjusted positions.

In testimony whereof we affix our signatures.

MORRIS WEINER.
GEORGE S. WEINER.